Oct. 1, 1946.          F. A. JENKS ET AL          2,408,425
                   INSTRUMENT LANDING SYSTEM
              Filed April 4, 1941         4 Sheets-Sheet 3
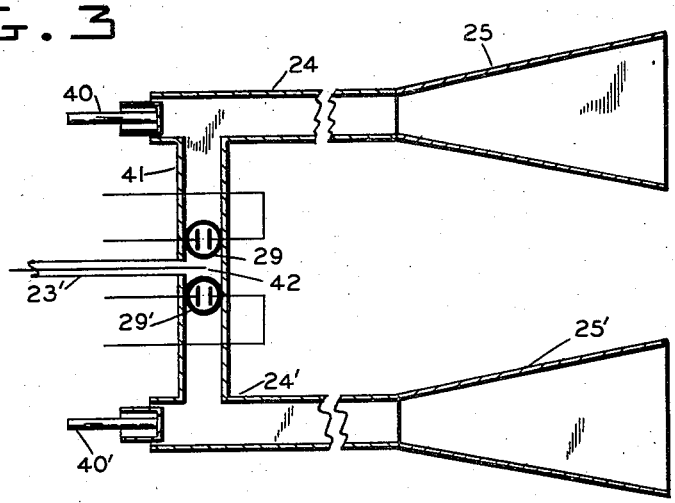
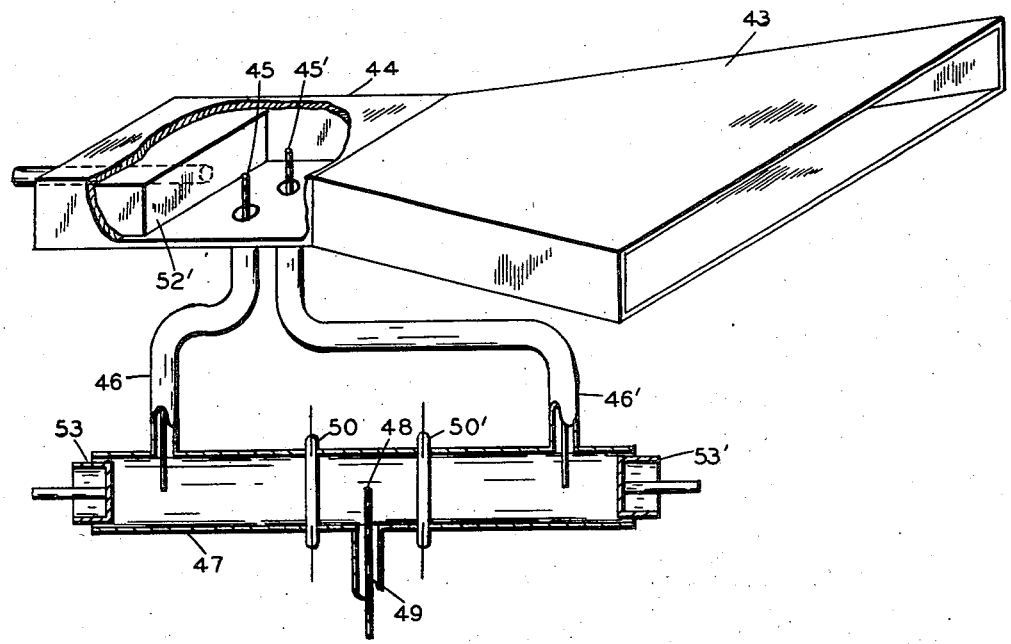
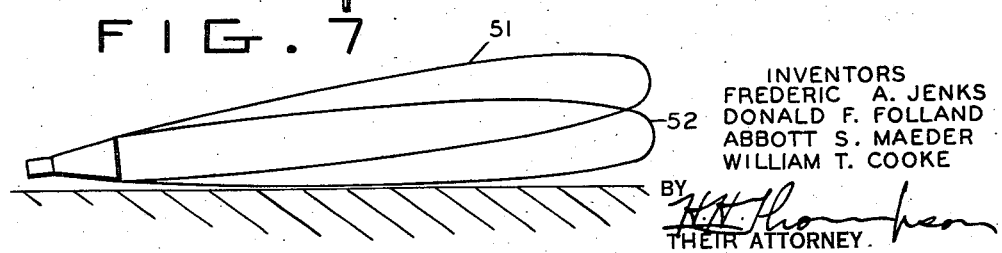
INVENTORS
FREDERIC A. JENKS
DONALD F. FOLLAND
ABBOTT S. MAEDER
WILLIAM T. COOKE
BY
THEIR ATTORNEY.

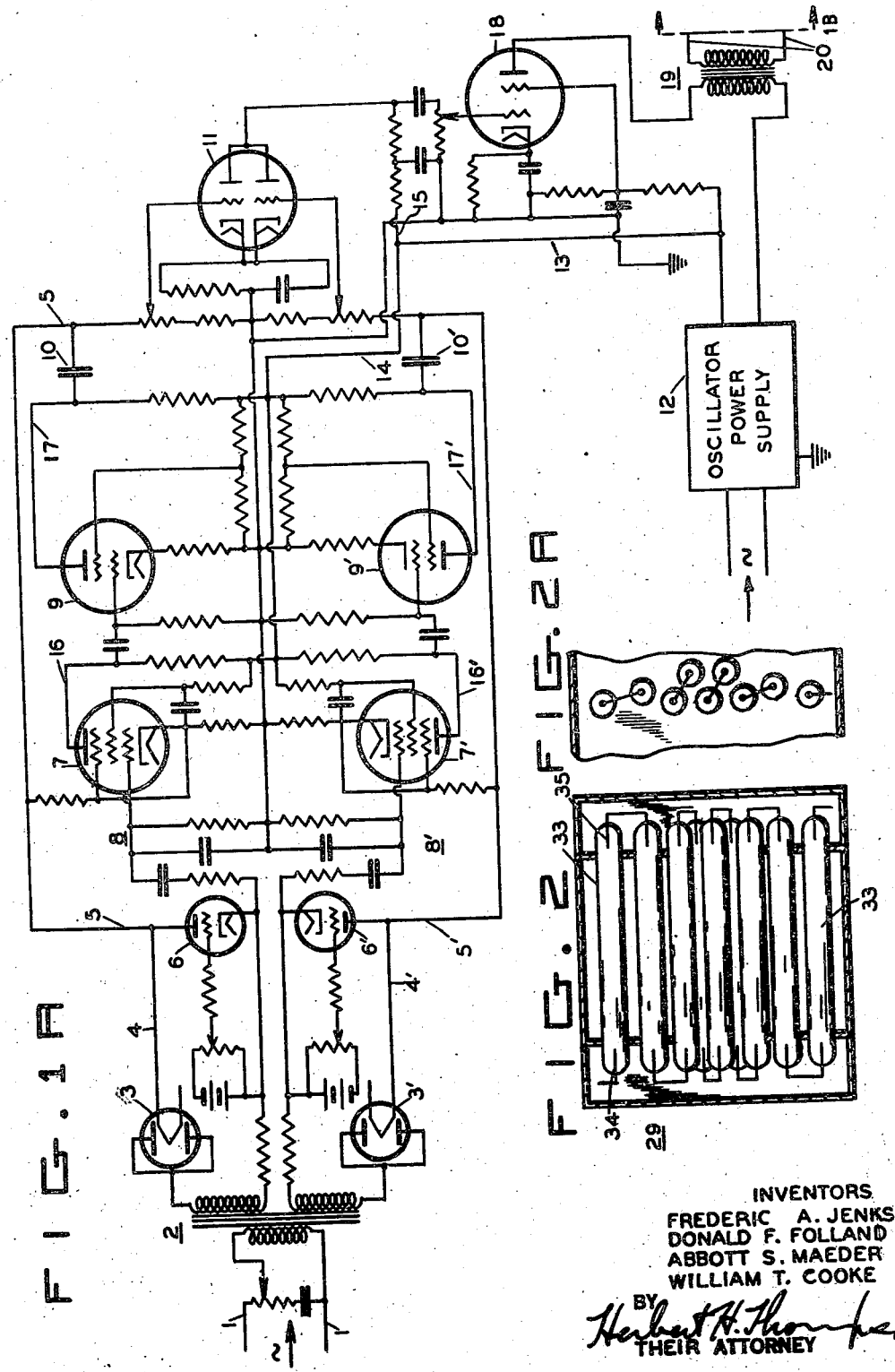

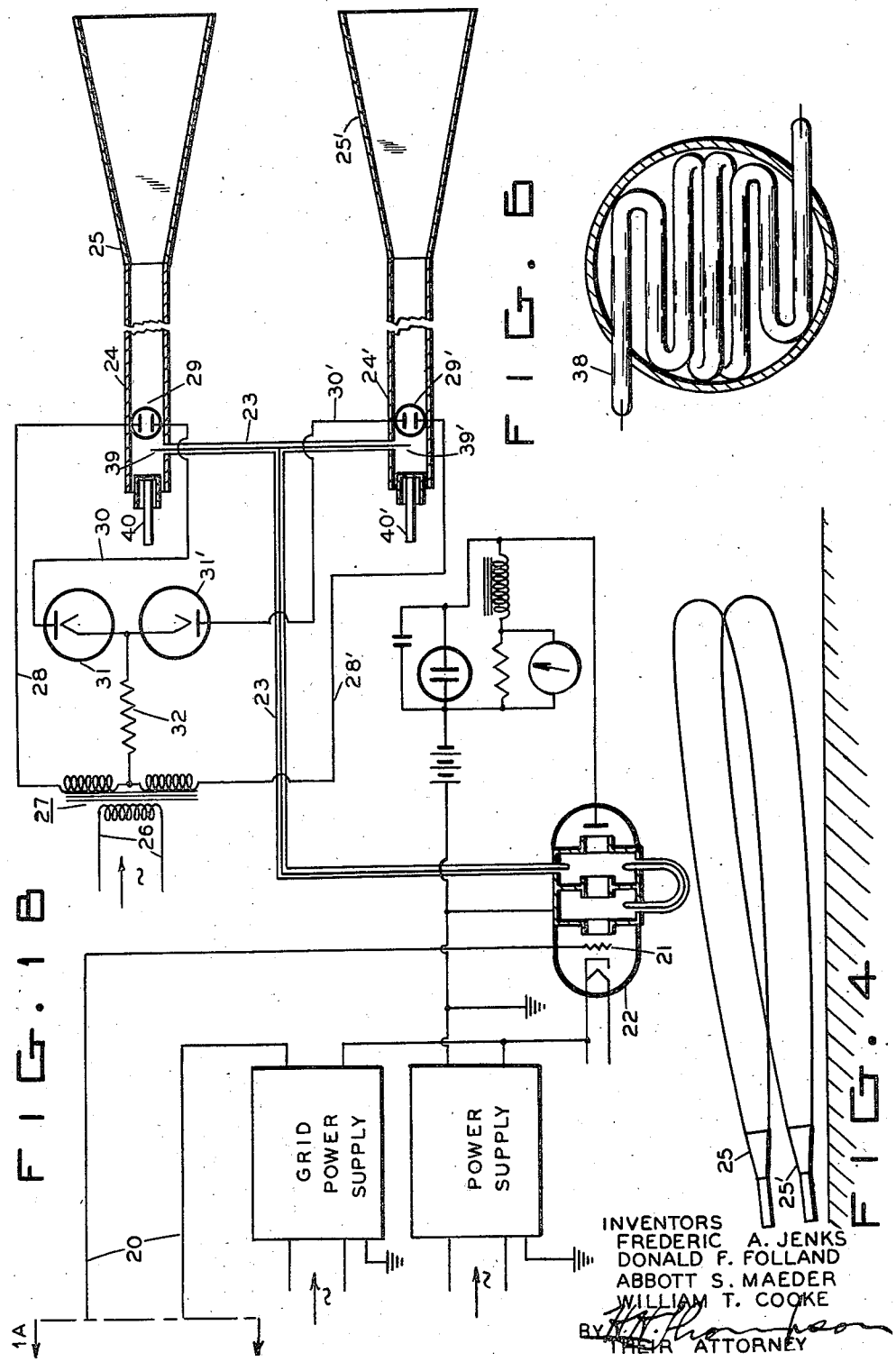

Oct. 1, 1946.  F. A. JENKS ET AL  2,408,425
INSTRUMENT LANDING SYSTEM
Filed April 4, 1941  4 Sheets-Sheet 4
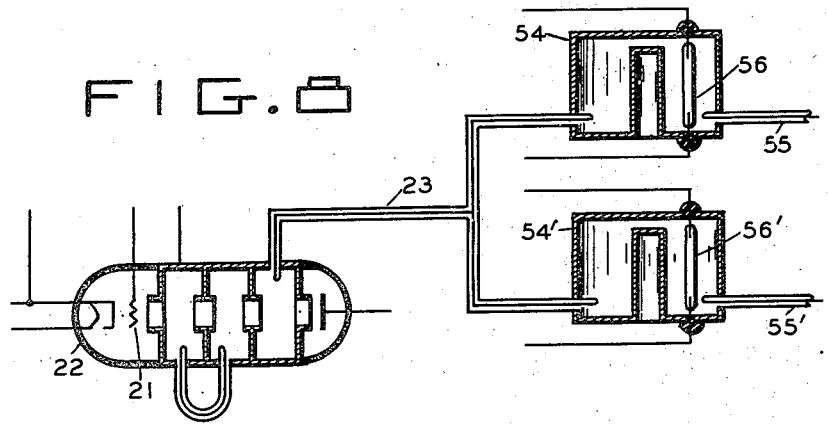
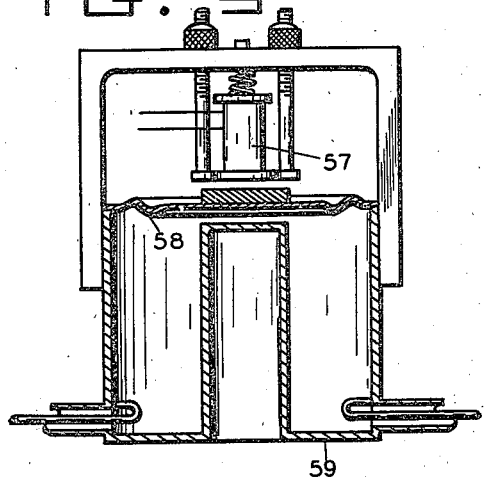
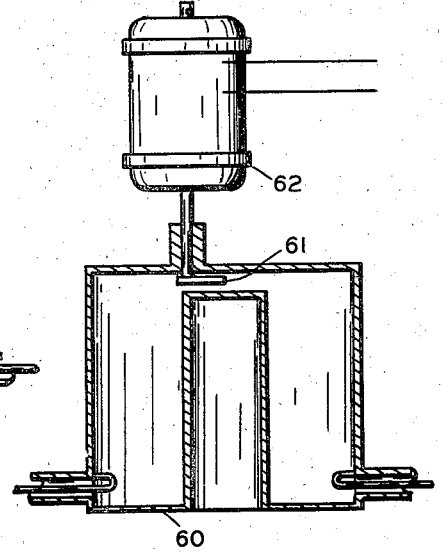
INVENTORS
FREDERIC A. JENKS
DONALD F. FOLLAND
ABBOTT S. MAEDER
WILLIAM T. COOKE
BY
THEIR ATTORNEY Patented Oct. 1, 1946

2,408,425

UNITED STATES PATENT OFFICE 2,408,425

INSTRUMENT LANDING SYSTEM

Frederic A. Jenks, Mineola, Donald F. Folland, Hempstead, Abbott S. Maeder, Scarsdale, and William T. Cooke, Huntington, N. Y., assignors to Sperry Gyroscope Company, Inc., Brooklyn, N. Y., a corporation of New York Application April 4, 1941, Serial No. 386,766

14 Claims. (Cl. 250—11)

This invention relates, generally, to the blind landing of aircraft and the invention has reference, more particularly, to a novel instrument landing system employing directed, overlapping and differently modulated radio beams providing a desired landing glide path for aircraft.

One object of the present invention is to provide a novel instrument landing system employing an ultra high frequency generator whose output is alternately modulated at two different frequencies, such output being alternately supplied to two directional radiation means producing two overlapping differently and alternately modulated directional radiation patterns, the overlapping portions of said patterns defining an aircraft glide path.

Another object of the invention lies in the provision of a novel instrument landing system employing gaseous tube discharge means for alternately suppressing the outputs of the two radiation means synchronously with the shift in modulation supplied to the high frequency oscillator.

Still another object of the present invention is to provide resonators in the circuit between the high frequency oscillator and said two radiation means together with means for alternately detuning said resonators to thereby alternately suppress the radiation from said two radiation means.

Other objects and advantages will become apparent from the specification, taken in connection with the accompanying drawings wherein the invention is embodied in concrete form.

In the drawings,

Figs. 1A and 1B show a wiring diagram of the instrument landing system of this invention.

Fig. 2 is a sectional view of a gaseous discharge tube means employed for effecting alternate operation of the electromagnetic radiation means.

Fig. 2A is a fragmentary end view of the structure of Fig. 2.

Fig. 3 illustrates one form of dual radiation means showing the gas discharge tube valve means applied thereto.

Fig. 4 is a schematic view in elevation showing the overlapping patterns produced by the dual radiation means.

Fig. 5 is a perspective view of a somewhat modified radiation means and the gas valve means applied thereto.

Fig. 6 is similar to Fig. 2 but illustrates a different type of gas discharge tube means.

Fig. 7 is a schematic view showing the radiation patterns produced by the structure of Fig. 5.

Fig. 8 is a sectional fragmentary view showing the use of resonators interposed between the ultra high frequency oscillator and the radiation means together with detuning means for effecting alternating shutting off of the outputs of the dual radiation means.

Figs. 9 and 10 show modified types of resonators and detuning means therefor suitable for use in place of the resonators shown in Fig. 8.

Similar characters of reference are used in all of the above figures to indicate corresponding parts.

Referring now to Figs. 1A and 1B, a low frequency A. C. supply such as commercial 60 cycle A. C. is furnished to leads 1 connected with the input transformer 2 having two secondary windings, corresponding ends of which are connected to the plates of rectifiers 3 and 3'. The cathodes of rectifiers 3 and 3' are connected by leads 4, 5 and 4', 5', respectively, to the plates of grid-controlled rectifier tubes 6 and 6'. Audio oscillators comprising tubes 7, 9 and 7', 9', shown as multi grid types and having series and parallel input circuits 8 and 8', respectively, are adapted to oscillate at two different audio frequencies, for example, oscillator 7, 9 may oscillate at 5000 cycles a second whereas oscillator 7', 9' may oscillate at 7500 cycles a second. The load circuits of oscillators 7, 9 and 7', 9' are capacity coupled by condensers 10 and 10' to the control grids of a double triode 11 serving as a mixer tube. The direct voltage for the plates of tubes 7, 7', 9, 9', and 11 is supplied by a rectifier-filter 12 through leads 13, 14 and 15.

In operation whenever the upper end of the divided secondary of transformer 2 goes positive rectifier 3 will pass current thereby energizing the plate of grid controlled rectifier 6 and causing this tube to conduct current. This action completes the feed back circuit of oscillator 7, 9 this feed back being via lead 17, condenser 10, and lead 5 through tube 6 to the grid of tube 7 with the result that oscillator 7, 9 commences to oscillate at the frequency determined by its input circuit 8. The output of this oscillator after amplification by the mixer tube 11, is supplied to an amplifier 18, the output of which in turn is fed through a transformer 19 and leads 20 onto the modulating grid 21 of an ultra high frequency oscillator 22. This oscillator may be of the general type disclosed and claimed in U. S. Patent No. 2,242,275, issued May 20, 1941, to R. H. Varian.

Whenever the lower end of the divided secondary of transformer 2 goes positive rectifier 3' passes current thereby energizing the plate of grid-controlled rectifier 6' so that this tube breaks down and carries current thereby completing the feed-back circuit for oscillator 7', 9' this feed back being via lead 17', condenser 10', lead 5', and tube 6' to the input of tube 7'. This oscillator immediately commences to oscillate at a frequency determined by its input circuit 8'. The output of tubes 7', 9' is also supplied to mixer tube 11, which in turn amplifies and supplies these oscillations to the amplifier 18, the output of which as before feeds through transformer 19 onto the modulating grid 21 of the high frequency oscillator 22. Thus, it will be seen that oscillators 7, 9 and 7', 9' are alternately put into oscillation, each of which oscillates for substantially a half cycle of the supply frequency fed in on leads 1. Thus, if this is a 60-cycle supply the grid 21 of the high frequency oscillator will be supplied with the outputs of oscillators 7, 9 and 7', 9' alternately for periods that are somewhat less than one-one hundred and twentieth of a second whereby the output of oscillator 22 is alternately modulated at frequencies such as 5000 and 7500 cycles a second. This output is shown supplied through a concentric line 23 to two wave guides 24 and 24' that are connected to electromagnetic radiation means such as horns 25 and 25', respectively, which horns are adapted to be directive set up at a slight angle on a landing field as shown in Fig. 4, for radiating beams having non-coincident axes.

The same alternating current that is supplied to leads 1 is also supplied to leads 26 connected to a transformer 27 having a center-tapped secondary, one outer end of which is connected by lead 28 to a gas discharge tube structure 29 contained within the wave guide 24 at a point between an antenna 39, and the horn 25. This tube structure in turn is connected by a lead 30 to a rectifier 31 connected in turn by resistor 32 to the midtap of the secondary of transformer 27. The gas tube structure 29 may have the form shown in Figures 2 and 2A. In these figures a plurality of gas discharge tubes are shown, each of which comprises an envelope 33 filled with an ionizable gas such as neon gas and containing a pair of oppositely located ionizing electrodes 34 and 35. The several tubes 33 having end electrodes 34 and 35 are connected in series for inclusion between leads 28 and 30.

The lower end of the secondary of transformer 27 is similarly connected by lead 28' to a gas discharge tube structure 29' which in turn is connected by lead 30' to a rectifier tube 31' and from thence through resistor 32 to the midtap of the secondary of transformer 27. Assuming that the upper end of transformer 27 goes negative at the same time that the upper end of transformer 2 goes positive then in that case the ultra high frequency output of oscillator 22 as modulated by the output of oscillator 7, 9 will be supplied to the radiating horn 25 but will not be supplied to horn 25', inasmuch as at this time gas discharge tube structure 29' will be passing current and hence acting as conducting layer to shield the horn 25' from the energy supplied to a wave guide 24' at this time. Since the lead 28 is negative at this time the gas discharge tube structure 29 does not pass current so that the same does not block the supply of modulated ultra high frequency energy to horn 25.

Similarly, when the lower end of transformer 2 goes positive the ultra high frequency output of oscillator 22 as modulated by the output of oscillator 7', 9' is supplied to the radiating horn 25' but is not supplied to radiating horn 25 since at this time the upper end of transformer 27 will be positive so that gas discharge tube structure 29 will be passing current to block the supply of the modulated ultra high frequency to horn 25. Thus, the radiating horns 25 and 25' will produce two overlapping directive lobes of electromagnetic radiation having non-coincident axes, which are alternately turned on and off, the upper lobe being modulated with a frequency of 5000 cycles a second, for example, and the lower lobe being modulated with a frequency of 7500 cycles a second. The overlapping region of these lobes provides a substantially straight glide path where the radio waves are alternately modulated at 5000 cycles a second and 7500 cycles a second so that the pilot picking up merely the 5000 cycles a second modulation signal will know that he is too high, whereas, if he picks up the 7500 cycles a second modulation signal alone, he will know that he is too low and so he is informed as to how to maneuver his ship to reach the glide path. By radiating only one lobe or beam at a time, standing waves or interference patterns are avoided, which might impair the definition of the glide path.

Instead of using a plurality of gas discharge tubes 33 as shown in Fig. 2, but a single tube 38 may be used, if desired, having the sinuous contour illustrated in Fig. 6 or any other shape necessary to fit the wave guide used, that is, to set up a conducting layer transverse of the guide which substantially blocks or materially reduces transmission of energy thereover.

The ends of guides 24 and 24' remote from the horns 25 and 25' and adjacent the radiating antennae 39 and 39' are provided with tuning plungers 40 and 40' for matching the impedance of antennae 39 and 39' to that of the guides 24 and 24'. It will be noted that when gas discharge tube structure 29, for example, is rendered conducting, the energy supplied to the guide by antenna 39 is largely dissipated within the guide and but little of it is returned to concentric line 23 for application to antenna 39'. In the structure shown in Fig. 3 on the other hand, the gas discharge tube structure 29 is shown installed in a branch wave guide 41 that interconnects the wave guides 24 and 24'. The gas discharge tube structure 29' is also installed in this branch wave guide 41, the tube structures 29 and 29' being located on opposite sides of the radiating antenna 42 supplied from concentric line 23'. In using this arrangement of Fig. 3, when gas discharge tube structure 29 is rendered conducting it acts as a reflector and reflects the modulated carrier downward in branch guide 41 and into guide 24' for radiation by horn 25'. Thus, when using this structure there is little attenuation of that portion of the energy which is blocked from going into horn 25 thereby obtaining a more efficient operation than that possible in Fig. 1B.

In the structure of Fig. 5 but a single horn 43 is used connected to a wave guide 44 into which project two radiating antennae 45 and 45'. The antenna 45 is supplied from a concentric line 46, whereas 45' is supplied from a concentric line 46'. Concentric lines 46 and 46' are connected adjacent the opposite ends of a wave guide 47 for receiving energy therefrom, this wave guide in turn being energized from an antenna 48 and fed from a concentric line 49. The gas discharge tube structures 50 and 50' are mounted on opposite sides of the antenna 48. It will be noted that antennae 45 and 45' are laterally displaced from one another within the short wave guide 44 so as to produce the patterns 51 and 52 shown in Fig. 7, comprising a pair of beams having non-coincident axes with an overlapping region providing a glide path. The operation of Figs. 5 and 7 is otherwise the same as the structure of Figs. 1A and 1B. The advantages of Fig. 3 are incorporated in Fig. 5 thereby obtaining a higher efficiency. A tuning plunger and reflector 52' is provided in guide 44 for matching the impedance of antennae 45 and 45' to that of this guide and similar plungers 53 and 53' are provided in wave guides 47.

In the structure shown in Fig. 8 the oscillator 22 is shown connected by the concentric line 23 to two cavity resonators 54 and 54' which in turn are adapted to be connected by concentric lines 55 and 55' to wave guides, not shown, feeding horns 25 and 25' or other directive radiation means. Resonators 54 and 54' are normally attuned to the frequency of the carrier output of oscillator 22 and when so tuned they readily pass energy from this oscillator to concentric lines 55 and 55'. Contained within each of these resonators are gas discharge tubes 56 and 56' adapted to be connected in the same manner as gas discharge tubes 29 and 29' in Fig. 1B. Thus, when tube 56 is rendered conducting it serves to detune resonator 54 so that energy is not supplied through concentric line 55 to horn 24 and vice versa. When tube 56' is rendered conducting, resonator 54' is detuned so that energy is not fed through line 55'. Thus, the switching structure shown in Fig. 8 may be used in lieu of the structure shown in Fig. 1B. The structure of Fig. 8 is claimed in a divisional application Serial No. 547,534, filed August 1, 1944, for a Switching and modulation system in the names of Frederic A. Jenks and Donald F. Folland.

Instead of using a gas discharge tube for detuning the resonator the same may be detuned by an electromagnet 57 as shown in Fig. 9. In this figure the electromagnet 57 adapted to be energized by leads 26, for example, of Fig. 1B acts to distort a flexible end 58 of a resonator 59 thereby detuning this resonator.

In Fig. 10, a resonator 60 is adapted to be used in lieu of each of the resonators 54 and 54' in Fig. 8 and in Fig. 10 the resonator 60 is intermittently detuned by a rotating conducting member 61 driven from a motor 62 which in turn is adapted to be supplied from leads 26. The structure of Fig. 10 is claimed in divisional application Serial No. 547,862, filed August 3, 1944, for a Switching and modulation system in the name of Abbott S. Maeder (deceased) by Lauretta Maeder Murphy, administrix.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an instrument landing system, an ultra high frequency generator, audio oscillator means for alternately modulating the output of said generator at different frequencies, a pair of directional radiators for radiating beams having non-coincident axes, means connecting the output of said ultra high frequency generator to said radiators including wave guides connected to said radiators, gas discharge tube means contained within each of said wave guides, and means for alternately energizing said gas discharge tube means synchronously with the changing of the modulation output of said generator, whereby said radiators alternately radiate the differently modulated carrier of said generator as mutually divergent beams of ultra high frequency energy.

2. In an instrument landing system of the character described, an ultra high frequency generator, a pair of audio oscillators of different frequency outputs, said oscillators having feedback means including grid controlled rectifiers, a source of A. C. supply connected for alternately energizing said grid controlled rectifiers whereby first one and then the other of said oscillators is rendered operative, and means for modulating the output of said generator with the outputs of said oscillators, whereby the output of said generator is alternately modulated at different frequencies.

3. In an instrument landing system of the character described, an ultra high frequency generator, a pair of audio oscillators of different frequency outputs, said oscillators having feedback means including grid controlled rectifiers, a source of A. C. supply connected for alternately energizing said grid controlled rectifiers whereby first one and then the other of said oscillators is rendered operative, means for modulating the output of said generator with the outputs of said oscillators, whereby the output of said generator is alternately modulated at different frequencies, a pair of electromagnetic radiation means, means connecting the ouput of said generator to said pair of radiation means including wave guide means and gas discharge tube means contained in said wave guide means and controlled from said source of A. C. supply for alternately supplying each of said radiation means with the output of said generator in synchronism with the alternate energization of said rectifiers.

4. In an instrument landing system, a pair of directive electromagnetic radiation members, wave guide means interconnecting said members, means for supplying eelctromagnetic energy to a point of said wave guide means, and a reflector comprising gas discharge tube means included in said wave guide means on opposite sides of said point of supply for alternately directing energy into one and then the other of said radiation members.

5. In an instrument landing system of the character described, electromagnetic directional radiator means having a pair of spaced input connections, and means for alternately energizing said radiator means, said energizing means including an electromagnetic energy conduit having energy delivered to a portion thereof and extending to said input connections, and gas discharge tube means contained within said conduit on opposite sides of said portion, said gas discharge tube means being alternately energized to provide a reflective curtain of ionized gas within said conduit for effecting the alternate application of energy to said respective radiator means.

6. In an instrument landing system of the character described, an electromagnetic directional radiator, a pair of mutually spaced antennae projecting into said radiator, and means for alternately energizing said antennae comprising a high frequency source, wave guides supplying energy from said source to said antennae and means for selectively producing a layer of ionized gas in said guides substantially blocking transmission of energy therethrough, the spacing of said antennae causing said radiator to radiate alternately, lobes of electromagnetic radiation having a common overlapping portion defining a glide path.

7. In apparatus of the character described, a plurality of directional radiators, means including a wave guide connected to each of said radiators for supplying high frequency energy thereto, and an energy reflector comprising gaseous tube discharge means in each of said guides selectively operable for controlling the transmission of energy through said guides to energize said radiators in sequence.

8. In an instrument landing system of the character described, an ultra high frequency generator, a pair of audio frequency oscillators having outputs of different frequency each comprising feed-back means, including a grid controlled rectifier for selectively rendering said feed-back means operative, an alternating potential supply and circuit means connected thereto for alternately placing said two grid controlled rectifiers in operative condition, means for modulating the output of said generator in sequence in accordance with the outputs of said oscillators to produce a pair of high frequency waves modulated at different audio frequencies, a pair of directive radiators adapted to radiate beams having noncoincident axes, and means for supplying said modulated waves respectively to said radiators in synchronous alternation with said variable modulation, comprising wave guide means and gaseous tube discharge means cooperative therewith and controlled from said source of alternating potential for alternately blocking transmission to said radiators.

9. In an instrument landing system of the character described, a plurality of radiators, an ultra high frequency oscillator, means including a wave guide connecting said oscillator to each of said radiators, means associated with each wave guide for producing a curtain of ionized gas substantially blocking the passage within said guide, and means selectively controlling said last means to cause transmission of energy to said radiators in repeated sequence.

10. A pair of directive electromagnetic radiation members, wave guide means interconnecting said members, means for supplying electromagnetic energy to a point of said wave guide means, and gas discharge tube means included in said wave guide means on opposite sides of said point of supply producing, when energized, a reflective curtain of ionized gas substantially blocking the passage through said guide means, and means controlling said tube means to alternately direct energy from said supply means to each of said radiation members.

11. Apparatus for alternately radiating a pair of high frequency beams having noncoincident axes comprising a pair of directive radiators, an ultra high frequency oscillator, branched wave guide means connecting said oscillator and said radiators, gas discharge tube means in each branch of said wave guide means producing, when in an operative condition, a layer of ionized gas within the passage of said wave guide means substantially blocking transmission of electromagnetic waves, and means for selectively placing said several tube means in operative condition to direct energy alternately to said radiators.

12. In an instrument landing system, a pair of directive radiators, an ultra high frequency oscillator, a pair of audio frequency oscillators having outputs of different frequency, means for alternately modulating the output of said high frequency oscillator in accordance with the outputs of said audio oscillators, branched wave guide means for supplying said modulated output to said radiators, gaseous discharge tube means associated with each of the branches thereof for selectively producing a layer of ionized gas substantially blocking transmission of electromagnetic waves thereover, and means for alternately producing an operative and a non-operative condition of said gaseous tube means in synchronism with the alternate modulation of said frequency oscillator.

13. A transmission system having a plurality of output circuits, a source of electromagnetic energy, wave guide means having portions between said source and each of said output circuits for translating energy from said source to said respective circuits, and gas discharge means located in each of said portions of said wave guide and being ionizable successively to provide a reflective curtain for alternately reflecting said energy from one and then another of said respective conduit means.

14. A method of directing radio frequency energy from a source through one of a plurality of radio frequency energy wave guides branching from said source to respective output circuits, said method comprising forming a reflecting curtain of ionized gas intermittently within one and then the other of said wave guides to direct said energy successively through said respective wave guides.

FREDERIC A. JENKS.
DONALD F. FOLLAND.
ABBOTT S. MAEDER.
WILLIAM T. COOKE.